1

United States Patent
Abe

(10) Patent No.: US 7,067,591 B2
(45) Date of Patent: Jun. 27, 2006

(54) BLOCK COPOLYMERS AND PROCESS FOR THEIR PREPARATION

(75) Inventor: Kazuto Abe, Oita (JP)

(73) Assignee: Basell Poliolefine Italia S.p.A., Milan (IT)

(*) Notice: Subject to any disclaimer, the term of this patent is extended or adjusted under 35 U.S.C. 154(b) by 9 days.

(21) Appl. No.: 10/250,724

(22) PCT Filed: Jan. 10, 2002

(86) PCT No.: PCT/EP02/00278

§ 371 (c)(1),
(2), (4) Date: Jul. 8, 2003

(87) PCT Pub. No.: WO02/066540

PCT Pub. Date: Aug. 29, 2002

(65) Prior Publication Data

US 2004/0077815 A1   Apr. 22, 2004

(30) Foreign Application Priority Data

Jan. 10, 2001  (JP)  .............................. 2001-002822
Jan. 10, 2001  (JP)  .............................. 2001-002916

(51) Int. Cl.
*C08F 297/02* (2006.01)

(52) U.S. Cl. ...................... 525/323; 525/194; 525/195; 525/250; 525/271; 525/314; 525/321

(58) Field of Classification Search ................ 525/323, 525/314, 321, 194, 250, 271, 195
See application file for complete search history.

(56) References Cited

U.S. PATENT DOCUMENTS

| 3,175,999 | A | * | 3/1965 | Crespi et al. ............. 526/348.6 |
| 4,491,652 | A | * | 1/1985 | Matthews et al. .......... 525/247 |
| 4,734,459 | A |   | 3/1988 | Cecchin et al. ............. 525/247 |
| 4,777,216 | A |   | 10/1988 | Busico et al. ............... 525/268 |
| 4,820,775 | A |   | 4/1989 | Shiga et al. ................. 525/247 |
| 5,387,649 | A | * | 2/1995 | DeBoer et al. ............. 525/271 |
| 5,391,629 | A |   | 2/1995 | Turner et al. ................ 525/268 |
| 5,594,080 | A |   | 1/1997 | Waymouth et al. ......... 526/126 |
| 6,114,443 | A |   | 9/2000 | Lohse et al. ................... 525/88 |
| 6,159,567 | A |   | 12/2000 | Charlier et al. ............ 428/36.9 |
| 6,211,300 | B1 |  | 4/2001 | Terano et al. ............... 525/323 |

2001/0014719 A1 * 8/2001 Suzuki et al. ................ 525/323

FOREIGN PATENT DOCUMENTS

| EP | 0280297 | 8/1988 |
| EP | 0482855 | 4/1992 |
| EP | 0700943 | 3/1996 |
| EP | 0700944 | 3/1996 |
| EP | 0703253 | 3/1996 |
| EP | 0860457 | 8/1998 |
| GB | 1030797 | 5/1966 |
| GB | 2213156 | 8/1989 |
| JP | 61271315 | 12/1986 |
| JP | 1149845 | 6/1989 |
| JP | 8092338 | 4/1996 |
| JP | 9231334 | 9/1997 |
| JP | 11349622 | 12/1999 |
| WO | 9527746 | 10/1995 |
| WO | 0190208 | 11/2001 |

OTHER PUBLICATIONS

Handbook of Thermoplastic Elastomers, B.M. Walker (ed.), Van Nostrand Reinhold, N.Y., pp. 5, 58-68 (1979).*
L. G. Lundsted et al., "The Applications of Block Copolymer Polyol Surfactants;" *Block and Graft Copolymerization*, R. J. Ceresa, Wiley, London; vol. 2, p. 113-272 (1976).
I. R. Schmolka, "A Review of Block Polymer Surfactants;" *Journal of the American Oil Chemists' Society*, vol. 54, p. 110-116 (1977).
I. Piirma, "Polymeric Surfactants in Emulsion Polymerization;" *Macromol. Chem. Macromol. Symp.*, vol. 35/36, p. 467-475 (1990).
L. A. Utracki, *Polymer Alloys and Blends: Thermodynamics and Rheology*; Hanser, Oxford Press, New York (1989).
I. W. Hamley, "Crystallization in Block Coplymers," *Advances in Polymer Science*, vol. 148, p. 113-137 (1999).
"Carbon-13 Observations of the Stereochemical Configuration of Polypropylene;" *Macromolecules*, vol. 6(6) p. 925-926 (1973).

(Continued)

*Primary Examiner*—Fred Teskin
(74) *Attorney, Agent, or Firm*—William R. Reid

(57) ABSTRACT

A block copolymer having structural formula A-B or A-B-A, wherein A is a crystallizable isotactic polypropylene block segment and B is an amorphous olefin elastomeric block segment; the novel crystallizable block copolymer may be used as it is as a molding material, or as a compatibilizer, a surfactant, a mechanical property improvement agent and the like for other polyemers.

13 Claims, No Drawings

OTHER PUBLICATIONS

"Model Compounds and 13C NMR Observation of Stereosequences of Polypropylene;" *Macromolecules*, vol. 8(5) p. 687-689 (1975).

T. Shiono et al., "Synthesis of Terminally Aluminum-Functionalized Polypropylene;" *Macromolecules*, vol. 25(13) p. 3356-3361 (1992).

T. Hayashi et al., "Microstructure in polypropylenes prepared with TiCl$_4$/MGCl$_2$-Et$_3$Al and Ti(OBu)Cl$_3$/MgCl$_2$-Et$_3$-Al catalystic systems;" *Polymer*, vol. 30, p. 1714-1722 (1989).

T. Hayashi t al., "Chain-End Structures in Polypropylene Prepared with δ-TiCl$_3$/Et$_2$AlCl Catalytic System in the Presence of Hydrogen;" *Macromolecules*, vol. 21, p. 2675-2684 (1988).

"New Polymer Experimental Technology 2, Synthesis and Reaction (1) Synthesis of Addition Polymers," edited by the Society of Polymer Science, Japan, Kyoritsu Publishing, p. 135 (1995).

* cited by examiner

US 7,067,591 B2

BLOCK COPOLYMERS AND PROCESS FOR THEIR PREPARATION

This application is the U.S. national phase of International Application PCT/EP02/00278, filed Jan. 10, 2002, and published Aug. 29, 2002 in the English language.

FIELD OF THE INVENTION

The present invention relates to a block copolymer comprising one or more crystallizable isotactic polypropylene block segments and an amorphous olefinic elastomeric block segment. The present invention also relates to a process for the production thereof and the use thereof.

PRIOR ART DISCLOSURE

In the production of polymer blends or polymer alloys containing a crystalline phase and an amorphous polymer phase as the second component, it is usually necessary to compatibilize the elastomer fraction to obtain surface activation, modification and improvement of mechanical properties in a higher order structure, by using various techniques, such as dispersion or emulsification in a polymer matrix.

A block copolymer may be used as a compatibilizer, to improve the compatibility between a polymer matrix and an elastomer component which are immiscible with each other. Common compatibilizers used in the art are block copolymers, graft copolymers containing a matrix polymer chain, or block copolymers having a reactive functional group (L. G. Lundsted, I. R. Schmolka, "Block and Graft Copolymerisation", R. J. Ceresa Wiley, London vol. 2, page. 113 (1976); I. R. Schomolka, *J. Am. Oil Chem. Soc.* 54:110 (1977); and I. Piirma, *Macromol. Chem., Macromol. Symp.* 35/36:467 (1990)). In the block copolymers mentioned above, every segment of the block chain is an amorphous polymer.

When in a polymer blend or a polymer alloy both the matrix component and the second elastomeric component are amorphous polymers, it is possible to disperse the second component into the polymer matrix by using, as a compatibilizer, a block copolymer consisting of these two components.

When one of the polymer blend components is crystallizable, as a property improvement agent is commonly used a block copolymer consisting of the two components in amorphous state; for instance, poly(styrene-ethylene-butylene-styrene) block copolymer (SEBS), obtained by hydrogenation of a styrene-butadiene block copolymer, is generally used as a property improvement agent for crystallizable polypropylene (JP-A-1989-149845, corresponding to GB 2213156).

However, even in the case of a block copolymer miscible with both the matrix and the second component, the block copolymer itself forms an intramolecular cohesive micelle, that may act as a low molecular weight surfactant, depending on the composition of the block copolymer, thus forming a micro phase separation structure. The negative effect is that the block copolymer has a tendency to form an intramolecular cohesive micelle (and induces micro phase separation) in a concentration higher than the critical micellar concentration under which the second component can disperse in the matrix. In this way, the high micellar concentration does not contribute to the compatibilization of the second component.

Furthermore, the use of these block copolymers impairs the phase stability of the polymer blend, due to the phase transition behavior of the micro phase separation, which depends upon temperature and composition.

Therefore, while at the time of manufacturing it is easy to obtain polymer blends wherein the matrix component and the second component are compatibilized, it is subsequently observed the decompatibilization and decomposition of the second component, when the blends are modified (for instance by increasing the matrix to dilute the second component) or undergo thermal treatments (during the melt mixing and/or stagnation, in the process from the first to the higher order finishing processes) or are further reheated during recycling operations. These drawbacks make it difficult to reach the essential target, such as the stabilization of higher order structure as a micro dispersed structure, and the improvement of mechanical properties. Therefore, it is felt the need to develop a block copolymer, having an optimized block segment structure and length, which is able to promote the formation of micelles in dilute system, and has dispersion and emulsifying ability; moreover, it is felt the need of a block copolymer able to give dilution stability and allowing the reduction of the quantity of compatibilizer to be used in a polymer blend system.

The crystallization of polymers is of great technological importance due to the mechanical properties imparted, which ultimately result from the change in macromolecular conformation.

Since crystallization leads to extended conformation or to kinetically controlled chain folding by thermal hysteresis and outer field, the difference of average length of folds strongly affects the mechanical properties of polymers.

In order to improve the impact strength of a crystalline polymer matrix, it is known in the art that a rubbery or glassy composition can be added as a second component; nevertheless, due to the conformational change of the crystalline matrix that occurs during the mixing process, the mechanical properties of the obtained compositions are in general less satisfactory than the those expected by summing up the properties of the two separate components (Leszak. A. Utracki, "Polymer Alloys and Blends: Thermodynamics and Rheology", Hanser, Oxford Press, New York, 1989).

Besides the use of block copolymers consisting solely of amorphous block segments, in the state of the art it was proposed the possibility of controlling higher order structure, including conformation, by using a block copolymer containing a crystallizable chain (I. W. Hamley, "Crystallization in Block Copolymers" Advances in Polymer Science, vol. 148, pag. 113 (1999)). More specifically, it was proposed to use a block copolymer and a graft copolymer containing one or more kinds of crystallizable polymers, in the range of one to all block segments, in order to obtain a macro-stable structure containing crystallizable phases and to control the intramolecular cohesive micelle (micro phase separation), by defining the components and structure of each of crystallizable and amorphous block segments of the copolymers.

In the above document, the crystallizable block segment of the block copolymers consisted of poly(ethylene), poly (oxyethylene), poly(ethylene glycol), poly(tetrahydrofuran) or poly(epsilon-caprolacton).

However, when trying to improve the resin properties by including crystallizable polymers such as isotactic polypropylene or polyamide known as engineering plastics, of which there is a great demand on the market, it must be remembered that different monomers for crystallizable polymers and amorphous polymers behave in a very different way, as regards their polymerization activity, polymerization mechanism and polymerization catalysts; block copolymers and graft-copolymer-block copolymers containing at least one kind of such crystallizable polymers has not been synthesized yet and isolated with a clear evidence of its linear structure (JP-A-1996-092338, corresponding to EP 703 253, and JP-A-1997-241334, corresponding to U.S. Pat. No. 6,211,300).

Several authors have shown the formation of partially atactic, partially isotactic polypropylenes which have elastomeric properties. Propylene homopolymers, containing different levels of isotacticity in different portions of the molecule, are described by R. Waymouth in U.S. Pat. No. 5,594,080; nevertheless, the block polymer chain structure is not well defined and controllable.

U.S. Pat. No. 6,159,567 discloses a propylene block copolymer comprising (A) 60–90% wt. of a first block of a propylene polymer and (B) 40–10% wt of a second block of an ethylenepropylene copolymer, containing 1–10% wt of ethylene. In U.S. Pat. No. 5,391,629, it is described a process for the production of block copolymers of ethylene and an alpha-olefin, by using an ionic catalyst system including a metallocene catalyst. The block copolymers produced in these documents do not contain a totally amorphous segment.

Under the above circumstances, the problem addressed by the present invention is to provide a new crystallizable block copolymer that allows the obtainment of polymer blends or polymer alloys having improved balance of properties with respect to the existing materials; said block copolymer must possess high mechanical strength, excellent modulus, thermal resistance and impact strength, and must show a wide thermal window for processing, so that the occurrence of non-decompatilization and other molding defects, such as flow marks, due to low moldability is avoided or decreased when said block copolymer is used as a compatibilizer for crystallizable polymers, as a surfactant, as a modifier and mechanical-property-improvement agent, or when used as the sole component. By using said block copolymer, the variation of the composition and the decompatibilization during heating would not be encountered, the higher order of structure such as dispersion ability would be stably formed and the conformation variation which decreases the character of the crystalline would not be substantially encountered.

SUMMARY OF THE INVENTION

The present invention concerns a block copolymer having formula:

A-B  (I)

or

A-B-A  (II)

wherein A is a crystallizable isotactic polypropylene block segment (Block A segment), and B is an amorphous olefinic elastomeric block segment (Block B segment).

DETAILED DESCRIPTION OF THE INVENTION

In the following is reported the detailed description of the present invention.

The block A segment of the block copolymer of the present invention is a crystallizable isotactic polypropylene block segment, and preferably propylene homopolymer or a copolymer of propylene with one or more alpha-olefins, having a number of carbon atoms up to about 20, such as ethylene and butene-1.

The content of alpha-olefin in the block A segment of these copolymers is preferably $\leq 10\%$ mol, in order not to reduce the crystallinity of said copolymers.

More preferably, the isotactic polypropylene block segment is highly stereoregular.

The isotactic pentad ratio (IP) of the isotactic polypropylene block segment mentioned above, measured by $^{13}$C-NMR spectroscopy, is preferably $\geq 85.0\%$, and more preferably $\geq 95.0\%$.

The greater is the IP ratio, the higher is crystallinity and the better is the effect of the present invention. The above mentioned IP ratio is measured by the method described in *Macromolecules*, Vol. 6, page 925 (1973).

The IP ratio represents the percentage of the isotactic pentads, based on the total number of chiral centers, in a polypropylene chain, measured by $^{13}$C-NMR spectroscopy. In the block copolymers of the present invention, the IP ratio is measured on the intermediate polypropylene block segment A, used to prepare the new block copolymer. The IP values were measured using the mmmm stereochemical shift strength ratio of the all stereochemical shifts within the methyl-carbon region of $^{13}$C-NMR spectroscopy, by assigning the stereochemical shifts according to the revised edition of the above-mentioned literature, as shown in the *Macromolecules*, Vol. 8, page 687 (1975).

The molecular weight of the Block A segment of the present invention must be sufficient to guarantee that the polymer chain length impart to the polymer a crystallizable nature.

More specifically, the degree of polymerization is preferably $\geq 5$, more preferably $\geq 10$. A sufficient crystallization ability is provided if the chain length is long enough to maintain a certain lamella thickness of the polypropylene crystals. There is no upper limit of the molecular weight, as long as the appropriate melt fluidity is maintained. Preferably the degree of polymerization ranges from 5 to 200,000, and more preferably from 10 to 100,000.

The term "crystallizable", as used herein for the Block A segment, characterizes those crystalline polymer segments which possess high degrees of inter- and intramolecular order, and which have a melting point preferably higher than 100° C., more preferably higher than 115° C., and preferably have a heat of fusion ΔH higher than 75 J/g, as determined by DSC analysis.

A narrow molecular weight distribution is preferable for the block copolymer of the present invention, since it must be able to control the crystallizable structure of the isotactic polypropylene block segment, this ability being one of the characteristics of the present invention.

The polymer crystallization is of high technical importance, since the mechanical properties are highly affected thereby, and it ultimately results from the macromolecular conformation and from the kinetically controlled chain folding.

On the other hand, crystallization in the novel block copolymer of the present invention leads to an equilibrium number of holds, as can be controlled by the size of the second, amorphous block B.

In order to obtain homogeneously the equilibrium number of holds, a narrow molecular weight distribution of the crystallizable block A segment is preferable. Mw/Mn is preferably $\geq 2.5$, and more preferably $\geq 2.0$.

These narrow molecular weight distribution values may be obtained with methods known in the art, such as by molecular weight fractionation of a solution of crystalline isotactic polypropylene having a relatively broad molecular weight distribution, obtained by polymerization. A suitable method of molecular weight fractionation is the fractional precipitation by decreasing the power of the solvent, or the temperature raising elution fractionation on chromatographic columns (such as the Dethrault method and the Baker-Williams method). However, other methods may be used in the present invention.

The crystallizable isotactic polypropylene segment (the Block A segment) of the block copolymer of the present invention may be produced by many processes.

Preferably, it is produced by polymerizing propylene or co-polymerizing propylene and other alpha-olefins, in the presence of a coordination catalyst, such as a Ziegler-Natta catalyst, a metallocene catalyst or other catalysts capable of producing an isotactic polypropylene. The thus obtained isotactic polypropylenes may have a terminal functional group, such as a double bond of an unsaturated hydrocarbon, in order to be used in the preparation of the block copolymers of the invention.

More specifically, without limiting purposes, a crystallizable isotactic polypropylene having a terminal double bond may be obtained by using a Ziegler-Natta catalyst system, comprising a tetravalent halogenated titanium compound and triethyl aluminum supported on $MgCl_2$, or by using a metallocene catalyst system, comprising ethylene-bis(tetreahydroindenyl)zirconiumdichloride, triethylaluminum and methylalminoxane (T. Shiono, K. Soga, *Macromolecules*, Vol. 25, 3356 (1992);T. Hayashi, Y. Inoue, R. Chujo, Y. Doi, *Polymer* Vol. 30, 1714 (1989)).

More preferably, a metallocene catalyst system is used, in order to obtain a crystallizable isotactic polypropylene with narrow molecular weight distribution, having a terminal double bond.

The presence of terminal double bonds on the isotactic polypropylene chains may be detected by general methods known in the state of the art. For instance, the existence of a terminal double bond can be confirmed according to the carbon atom assignments reported in *Macromolecules*, Vol. 21, page 2675 (1988), by $^{13}C$-NMR spectroscopy of the polymer solution.

Another terminal group of the polypropylene chain may have a 1-methylbutane structure. Crystallizable isotactic polypropylenes having this kind of terminal double bond can be suitably used for the preparation of the novel block copolymers of the present invention.

Another method of preparation of isotactic polypropylene is the cistactic living 1,4-polymerization of a conjugated diene monomer, such as (E)-2-methyl-1,3-pentadiene, which is a dimer of propylene and can be polymerized by using a so-called half-metallocene catalyst, such as methoxycarbonyl-methylcyclopentadienyl-trichloro-titanium, followed by catalytic hydrogenation reaction that maintains the stereoregularity, for instance by using the Lindlar catalyst or similar catalysts.

A crystallizable isotactic polypropylene can be made even by using the above reported methods together, carrying out a stereospecific polymerization and a living polymerization at the same time.

In these preparation methods, using the cistactic living 1,4-polymerization of a conjugated diene monomer, the terminal double bond, which is necessary for the process previously mentioned, is no longer necessary because there is already a reactive group having a living terminal.

While a crystallizable isotactic polypropylene can be made according to the production methods mentioned above, the process for producing the block copolymers of the present invention is not limited by these examples.

In the following, the amorphous Block B segment will be described more in details.

The Block B segment is an amorphous olefin elastomeric block segment, and more preferably the Block B segment is an olefin elastomeric block segment obtained by the polymerization of an olefinic unsaturated monomer, so that the block copolymer A-B (I) corresponds to the following formula (I)':

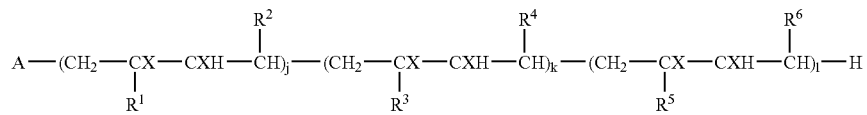

or the tri-block copolymer A-B-A (II) corresponds to the following formula (II)':

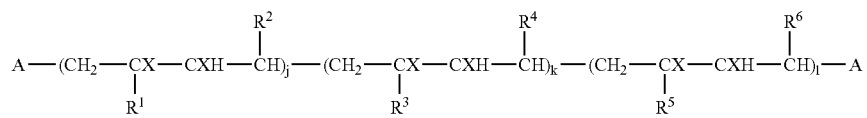

wherein A is the Block A segment; X is hydrogen, or two X groups linked to two adjacent carbon atoms form a carbon-carbon double bond; the groups $R^1$ to $R^6$ are independently hydrogen or an unsaturated or saturated alkyl group, having 1 to 8 carbon atoms; j, k and l are independently 0 or an integer >0, and at least one of j, k and l is an integer >0. More preferably, j, k and l, the same or different from each other, are integers comprised between 0 and 10,000.

The block B segment, which is substantially represented in the above formulae (I)' and (II)", may contain units derived from a polymerization initiator or a coupling agent.

Suitable olefinic unsaturated monomers are alpha-olefins having 2 to 20 carbon atoms (including those having an aromatic group in the side chain), such as ethylene, propylene, 1-butene and styrene, and di-olefins containing 4 to 20 carbon atoms, and preferably conjugated di-olefin such as butadiene, isoprene, 2-methyl-1,3-pentadiene and the like.

Non limiting examples of amorphous elastomer blocks, used as the Block B segment, are ethylene-propylene-copolymer elastomers, ethylene-butene-copolymer elastomers, copolymer elastomers consisting of ethylene and an olefin having 2 to 20 carbon atoms (including olefins having aromatic side chain group) or monomers containing 2 or more of these olefins, block copolymers consisting of ethylene-propylene block copolymers obtained by multi-stage polymerization, and copolymers containing one or more conjugated dienes, such as block copolymers of ethylene with butadiene, isoprene and 2-methyl-1,3-pentadiene.

It is important to the invention that the above-mentioned Block B segment is amorphous. In fact, the presence in such segment of many methylene chains and many stereoregular methylethylene chains is not desired, because they show the properties of a polyethylene crystal and a polypropylene crystal respectively. By "amorphous" is meant herein a polymer segment having very low crystallinity or totally amorphous; the Block B segment has preferably a solubility in xylene at room temperature >70% by weight, preferably >80%, and even more preferably >90% by weight.

With reference to the molecular weight of the Block B segment of the present invention, the length of the polymer chain must be sufficient to retain the polymer characteristics. The molecular weight is preferably $\geq 100$ g/mol, more preferably $\geq 1000$ g/mol. Even more preferably, the polymer chain is long enough to maintain a radius of gyration or an end-to-end distance comparable to the lamella thickness of polypropylene crystals.

There is no limit for the maximum molecular weight, as long as the polymer maintains an appropriate melt fluidity. More preferably, the molecular weight ranges from 100 to 500,000 g/mol.

Furthermore, with respect to the molecular weight distribution of the Block B segment, narrow values are preferred, as already explained for the crystallizable Block A. Preferably, Mw/Mn is $\leq 2.0$. Living polymerization is suitable for the production of an olefinic elastomer having a narrow molecular weight distribution.

More preferably, living polymerization using an organometallic compound as an initiator is used for the preparation of the Block B, due to the fact that the amorphous block structure of the Block B can be controlled more precisely by sequentially changing monomers ("New polymer experimental technology 2, Synthesis and reaction (1) Synthesis of addition polymers", edited by the Society of Polymer Science, Japan, Kyoritsu Publishing, page 133 (1995)).

Among the polymerization initiators having such characteristics, bifunctional anion polymerization initiators are suitable for preparing the tri-block copolymer of the invention. However, commonly known processes may be employed in the preparation of the Block B segment, such as living cation polymerization, living coordination polymerization, group transfer polymerization and the like; commonly known catalysts and reaction systems may be used. The process for producing the block copolymer of the present invention is not limited to the methods mentioned above.

In the preparation of the Block B segment, every condition used for an addition polymerization and a stereospecific polymerization, such as 1,4-polymerization, 1,2-polymerization, head-to-head or head-to-tail addition, cistactic and transtactic polymerization, can be used for the polymerization of a conjugated diene monomer. More precisely, a monomer having a carbon-to-carbon double bond in the main chain or side chain of the Block B segment may be used.

It is also possible to produce an amorphous olefinic elastomer by hydrogenation of such carbon-to-carbon double bond, by using methodologies known in the state of the art. This method is preferred, since the hydrogenation of the carbon-to-carbon double bonds leads to an increase of torsional freedom in the intramolecule, thus dramatically enhancing the number of rotational isomers; the consequent increase in entropy leads to an improvement of the properties of the elastomer.

Suitable examples of hydrogenation reaction catalysts are Ni-containing catalysts or Pt-containing catalysts supported on calcium carbonate (Lindlar catalyst), and the reaction may be performed under reaction conditions well known in the art, for instance at room temperature and pressure, at high temperature and pressure, in a fluid bed system, in a fixed bed system and the like, in a solvent such as water, in a polar solvent or in a non-polar solvent.

It is preferable to work under mild reaction conditions in order to hydrogenate all the unsaturated hydrocarbons, at the same time avoiding the decomposition of the polymer chains (JP-A-1999-349622); nevertheless, the reaction conditions of the present invention are not limited to those mentioned above.

As already reported above, in the block copolymers of the present invention, the Block A segment and the Block B segment may be prepared separately, at the same time or sequentially.

In the following are described the processes for producing the block copolymer of formula A-B (I).

When the A-B block copolymer is prepared by a coupling reaction using a coupling agent, after the separate preparation of the Block A segment and the Block B segment, it is preferably added a coupling agent which reacts either with the Block A segment or with the Block B segment, said coupling agent being employed in a quantity slightly higher than the equal molar quantity, and then the formation of A—A or B—B is avoided by adding the residual block segment (B segment or A segment). The preparation process of the present invention is not limited to the above-mentioned example.

A preferred process for preparing a block copolymer of formula A-B (I) of the present invention is shown in the following: as mentioned above, an active terminal carbanion is obtained in a solvent, such as a non-polar solvent, by a reaction between a terminal unsaturated bond of an isotactic polypropylene and an organometallic compound, such as lithium naphthalene, t-butyllithium, s-butyllithium and the like.

Moreover, as mentioned above, a terminal carbanion is obtained by a living anion polymerization of an olefinic unsaturated monomer.

A block copolymer is then obtained by the coupling reaction of each of the terminal carbanions obtained above.

As coupling agents, hydrocarbons having both the terminal carbon atoms halogenated, or halogenated silane compounds can be mentioned without limitation.

The above-mentioned coupling reaction is preferred, because it is possible to clarify the structure of the obtained block copolymers, by sampling during the preparation stages of each block segment.

Another preferred process for producing the block copolymer of the present invention comprises the polymerization of an olefinic unsaturated monomer by sequential living anion polymerization, using a carbanion obtained by a reaction between a terminal unsaturated bond of an isotactic polypropylene and an organometallic compound as an initiating point of the polymerization; in this way, the polymer characteristics such as the molecular weight, molecular weight distribution, stereoregularity and the like, can be controlled by regulating the quantity of olefinic unsaturated monomer or by changing the reaction system.

Another process for preparing a novel crystallizable block copolymer according to the present invention is reported below, without limiting the scope of the present invention: the cistactic living 1,4-polymerization of conjugated diene, such as (E)-2-methyl-1-3-pentadiene, which is the dimer of propylene, is carried out by means of a half-metallocene catalyst, such as methoxycarbonyl-methyl-cyclopentadienyl-trichloro-titanium, followed by the addition of diene monomers, such as butadiene, isoprene and the like to effect sequential cistactic living 1,4-polymerization; the thus obtained block copolymer is then submitted to a catalytic hydrogenation reaction, maintaining the stereoregularity by using a Lindlar catalyst or the like. In this way, the polymer block segment of the propylene dimer is transformed by hydrogenation into an isotactic polypropylene, and at the same time the polymer block segment of the polymer obtained by sequential polymerization of the diene monomer is modified by hydrogenation into an olefinic elastomer, which is a saturated hydrocarbon.

In the following are described the processes for producing the tri-block copolymer of formula A-B-A (II).

A preferred process for preparing a tri-block copolymer of the present invention is shown below: as reported above, an active terminal carbanion is obtained in a solvent, such as a non-polar solvent, by reaction between a terminal unsaturated bond of an isotactic polypropylene and an organometallic compound, such as lithium naphthalene, t-butyllithium, s-butyllithium and the like.

Moreover, as mentioned above, a terminal carbanion is obtained by a living anion polymerization of an olefinic unsaturated monomer.

Carbanions at both terminals are obtained by a living anion polymerization, using a bifunctional initiator.

A tri-block copolymer is then obtained by the cross-coupling reaction of each of terminal carbanions obtained above.

As coupling agents, hydrocarbons having both the terminal carbon atoms halogenated, or halogenated silane compounds can be used.

The above-mentioned reactions are preferred, because it is possible to clarify the structure of the block copolymers finally obtained, by sampling during the preparation stages of each block segment.

Another preferred process for producing the tri-block copolymer of the present invention comprises the polymerization of an olefinic unsaturated monomer by sequential living anion polymerization, using a carbanion obtained by a reaction between a terminal unsaturated bond of an isotactic polypropylene and an organometallic compound as an initiating point of the polymerization, followed by a dimerization reaction using a coupling agent; in this way, the polymer characteristics such as the molecular weight and molecular weight distribution can be controlled.

Another embodiment of the process of the present invention to obtain a novel crystallizable tri-block copolymer is reported in the following, without limiting the scope of the present invention: the cistactic living 1,4-polymerization of a conjugated diene as a monomer, such as (E)-2-methyl-1-3-pentadiene, which is a dimer of propylene, is carried out by means of a half-metallocene catalyst, such as methoxycarbonyl-methyl-cyclopentadienyl-trichloro-titanium, followed by the addition of diene monomers, such as butadiene, isoprene and the like to effect sequential cistactic living 1,4-polymerization; the thus obtained block copolymer is then submitted to a catalytic hydrogenation reaction, maintaining the stereoregularity by using a Lindlar catalyst or the like. In this way, the polymer block segment of the propylene dimer is transformed by hydrogenation into an isotactic polypropylene, and at the same time the polymer block segment of the polymer obtained by sequential polymerization of the diene monomer is modified by hydrogenation into an olefinic elastomer, which is a saturated hydrocarbon.

The scope of the present invention is not limited to these methods.

With reference to the conformation of the polymer chain of a crystalline isotactic polypropylene, which remarkably affects the mechanical properties of said polypropylene, whether said conformation is lead by a fully extended conformation or a certain fixed chain folding is essentially a kinetic problem, related to the external environment such as rheological environment and elongation strain, crystallization temperature, thermal hysteresis and the like; differently, for the crystallizable new block copolymers of the present invention obtained as mentioned above, an equilibrium folds derived from the microstructure can be formed and the number of such folds may be controlled by the magnitude of the unperturbed dimension of the amorphous block chain B.

In addition, since the new crystallizable block copolymer of the present invention is a copolymer with a controlled structure, both in the crystallizable segments and in the dispersion of the amorphous elastomer segments, and decomposition can be suppressed, the block copolymer of the present invention is preferably used as a molding material as it is, or it may be used as a resin modifying agent, as a compatibilizer, surface surfactant, modifier. Moreover, it may be used as an agent to improve the mechanical properties of the products obtained by injection molding of general polymers and polymer blends, of the products obtained by blow molding or extrusion molding, such as fibers, films, sheets and foamed articles having an homogeneous structure as a whole, excellent moldability, a good balance in mechanical properties and recyclability, which is determined by the stabilization of the phase structure in the case of re-heating.

In particular, the novel crystallizable block copolymers of the present invention show excellent mechanical properties and are endowed with high stability; moreover, they solve the problem connected to recycling difficulty.

The block copolymers of the present invention may be suitably used in the automotive industry, for appliance materials and parts, or as compatibilizers, surfactants, modifiers and agents for improving the mechanical properties of polymers and polymer blends useful in the manufacture of packaging material for food, cosmetic formulations and medical formulations. For the above purposes, the block copolymers of the present invention may be mixed with polyolefins, such as polyethylene, polypropylene and the like, polyvinylchloride, polyvinylalcohol, polyacrylonitrile, polyacrylic acid plastics, diene plastics, thermoplastics, such as polyamides, polyesters, polycarbonates and thermoplastic elastomers.

Further, as polymer blends, a blend of two or more kinds of polymers mentioned above, or a blend of one or more kinds of other polymers mentioned above and, when necessary, additives such as plasticizers, stabilizers and colorants may be used.

Without limiting purposes, the present invention is further illustrated by the following examples.

The methods for measuring the polymer properties reported in the examples and in the comparative examples are shown below.

Molecular weight (Mw) and molecular weight distribution (Mw/Mn): Mw and Mw/Mn were measured by GPC, under the following conditions.

Preparation of the Calibration Curve:

2 mg each of three kinds of standard polystyrene samples (manufactured by Showa Denko K.K.) were introduced into 10 mg of 1,2,4-trichlorobenzene containing 0.1% wt. of 2,6-di-t-butyl-p-chresol (BHT), and were dissolved in 1 hour, in the dark, at room temperature.

Then, the elution time of a top peak was measured by GPC measurement.

The measurements were repeated and the calibration curve was prepared by linear approximation, using 12 molecular weights (molecular weights from 580 g/mol to 8,500,000 g/mol) and top peaks elution times. The thus measured values were those reduced to the values for polystyrene.

Measurement on Samples:

2 mg of a sample were introduced into 5 ml of 1,2,4-trichlorobenzene containing 0.1% wt. of BHT and dissolved, in 2 hours, at 160° C. under agitation, followed by a GPC measurement.

Other Measuring Conditions:

Apparatus: Type 150 C: manufactured by Waters

Eluent: 1,2,4-trichlorobenzene (containing 0.1% wt. of BHT)

Columns: Shodex HT-G (1 column) and Shodex HT-806M (2 columns)

Measuring temperature: 140° C.

Preparation of samples: about 2 mg of sample were dissolved into 1,2,4-trichlorobenzene (containing 0.1% wt. of BHT), for 2 hours at 160° C.

Quantity of an injected sample: 0.5 ml

Elution velocity: 1.0 ml/min

Measurement of the isotactic pentad ratio (IP) and confirmation of the terminal double bond:

The measurement of IP of a crystallizable isotactic polypropylene and the confirmation of its terminal double bond were performed under the following conditions, using GSX400 (at the $^{13}$C-NMR frequency of 100 MHz) made by JEOL.

The IP was calculated according the method reported in *Macromolecules*, Vol. 6, page 925 (1973), and the presence of a terminal double bond was confirmed according to the carbon assignments reported in *Macromolecules*, Vol.21, page 2675 (1988).

Measuring mode: Proton decoupling method

Pulse width: 8.0 micro s

Pulse frequency: 3.0 micro s

Number of integration: 20,000 times

Solvent: 1,2,4-trichlorobenzene/deutrium benzene mixed solvent (weight ratio=75/25)

Internal standard compound: Hexamethyldisiloxane

Concentration of sample: 300 mg in 3.0 ml solvent

Measurement temperature: 120° C.

Confirmation of Phase Stability:

The crystallization temperature measured by DSC (Differential Scanning Calorimeter) was used as an indicator.

DSC 7 by Perkin Elmer was used as the DSC; the temperature increase velocity was 20° C./min and the temperature decrease velocity was 10° C./min.

The confirmation of phase stability was probed by measuring the enthalpy H (the heat of fusion) that is at the second temperature decreasing.

EXAMPLE 1

Block Copolymer A-B (1) Preparation of the Olefin Polymerization Catalyst (Metallocene Catalyst)

A double jacket reactor equipped with agitator, reflux condenser, temperature sensor and gas inlet, was used under a controlled inner temperature.

Into said reactor, 176 ml of 2.5M n-butyl lithium-hexane solvent were dropped in 40 minutes into 700 ml THF solvent containing indene (0.4 mol, 4.62 g), maintained at 0° C. Then, hexamethylphosphoroustriamide (HMPA: 0.44 mol, 76 ml) was added.

After the reactor mixture was cooled to the temperature of −78° C., 100 ml of a THF solution containing 1,2-dibromoethane (0.22 mol, 19 ml) were gradually added.

The violet solution formed was heated gradually up to the room temperature; then it was cooled again to 0° C., and under these conditions, the solution underwent hydrolysis by the addition of a saturated solution of ammonium chloride (200 ml).

100 ml of diethyl ether were added to this mixed solution, which separated into two phases; it was then transferred to a separation funnel, and after the diethyl ether layer was sufficiently rinsed by using water, HMPA was removed by rinsing with a water solution of copper sulfate. After drying by using anhydrous magnesium phosphate, it was obtained a mixture of a solid and an oil, then filtered.

37 g of 1,2-bis(3-indenyl)ethane were obtained from the mixture by re-precipitation with acetone-ethanol.

48.5 ml of 1.6 M n-butyl lithium-hexane solution were dropped into 150 ml of THF solution containing 1,2-bis(3-indenyl)ethane, obtained as reported above (38.8 mmol, 10 g), in 40 minutes under stirring, at the temperature of 0° C.

The thus obtained solution was added all together to a THF solution (14.7 g/150 ml) containing zirconium tetrachloride-THF complex, separately prepared in another reactor and it was stirred for 8 hours.

The mixed solution was dried to solid by means of an evaporator; after the addition of 100 ml of methylene chloride, it was filtered to obtain a solid.

The thus obtained yellow solid was rinsed with toluene, then rinsed with ether until the filtrate became clear and the racemic complex Et(Ind)$_2$ZrCl$_2$ was obtained.

The hydrogenation process of this complex is shown below.

In a 1-L stainless steel autoclave, 163 mg of the complex Et(Ind)$_2$ZrCl$_2$ were introduced and suspended in 50 ml of methylene chloride.

Then 12 mg of black Lindlar catalyst supported on calcium carbonate (Pd/CaCO$_3$) were added and underwent a reaction under a hydrogen pressure of 6.8 MPa, at a temperature of 70° C., for 100 min.

After the reaction, the pressure was decreased to normal pressure, the catalyst mixture was filtered after the addition of 50 ml of methylene chloride, the obtained liquid was dried to become solid and this solid was re-crystallized from hot toluene, thus obtaining 110 mg of Et(H$_4$Ind)$_2$ZrCl$_2$.

0.4 g (0.96 mmol) of Et(H$_4$Ind)$_2$ZrCl$_2$ thus precipitated were sufficiently dehydrated and underwent methylation as follows: they were introducing into a 500-ml flask, which was sufficiently dehydrated and dried, cooled with ice at 0° C., and 1.34 ml of 1.4 M methyl lithium-ether solution were added and maintained under stirring for 2 hours.

The reaction mixture was filtered under dry nitrogen, and the filtrate was concentrated; after cooling at the temperature of −20° C., the methylated Et(H$_4$Ind)$_2$ZrMe$_2$ was recuperated by re-precipitation. After rinsing 3 times with 1-L each of hexane, it was finally dried to obtain about 0.12 g of an olefin polymerization catalyst component.

(2) Preparation of the Block A Segment

Under nitrogen atmosphere, in a 100 ml-flask, the olefin polymerization catalyst Et(H$_4$Ind)$_2$ZrMe$_2$ (5 mg), prepared as reported above, and 50 ml of a toluene solution containing 10.7% wt. methylalumoxane (made by Tosoh-Akzo), we contacted for 20 minutes, at room temperature.

4 ml of a toluene solution of 0.5 mol/L tri-i-butylaluminum (hereinafter called "TIBA") and 20 mol of propylene were introduced into an autoclave with an inner volume of 6.0 L and the temperature was raised to 50° C.

Then, the metallocene catalyst prepared as reported above was introduced into the autoclave under pressure and the polymerization was carried out for 60 minutes. The polymer obtained was purified by a standard method and an isotactic polypropylene having a melting point of 149.1° C. was obtained. By $^{13}$C-NMR spectroscopy measurement, it was confirmed that IP was 95% and a carbon-to-carbon double bond existed at one of the two terminals.

GPC measurement revealed that molecular weight (Mw) was 230,000 and molecular weight distribution (Mw/Mn) was 1.8. The ΔH (the heat of fusion) obtained by DSC measurement was 80 J/g.

(3) Preparation of Block B Segment

Living anion polymerization in a vacuum line:

A 300-ml flask was set to a vacuum line in which the impurities were purged, in order to carry out a living anion polymerization; then, 3.4 g of isoprene, previously sufficiently purified, [(1) for 1 night at reflux under agitation with CaH$_2$, (2) then, the solution was contacted with sodium pellets, at room temperature, and maintained under stirring for 24 hours or longer. A small amount of oligomers was produced at this operation. (3) The solution was contacted with n-butyllithium at room temperature, and (4) was divided into small fractions after distillation using a Schlenk tube] were introduced into this flask by way of a Schlenk tube, under vacuum, and sufficiently purified n-hexane was also introduced into the flask, after distillation.

The temperature of this solution was raised to room temperature and, under constant stirring, the solution was allowed to cool to 0° C. with an ice-water bath.

3.12 ml of cyclohexane-n-hexane solution containing 0.155 mmol of sec-butyl lithium were introduced by means of a previously equipped inlet tube with a breakable seal, to effect a living anion polymerization.

After a reaction of 30 minutes or longer, the reacted solution was solidified by cooling with liquid nitrogen.

0.0025 mmol of 1,2-dibromoethane as a coupling agent, previously prepared at the inlet tube, were added all together, and the mixture was then heated to −70° C. by using dry-iced methanol to cause the mixture to liquefy and react.

A portion of this reaction mixture, having a yellowish cream color, was taken and 100 ml of methanol were injected, and the filtered product was dried under vacuum to obtain polymer.

It was confirmed by analysis that the polymer was cis-tactic-poly(1,4-isoprene) polymer, having a molecular weight (Mn) of 28,800 g/mol and having a molecular weight distribution (Mw/Mn) of 1.18.

(4) Preparation of the Block Copolymer A-B

A three-inlet flask equipped with reflux, inlet tube and agitator, from which impurities were sufficiently purged, was connected to the vacuum line, and 0.3 g of isotactic polypropylene obtained as reported in (2) and re-precipitated from hot xylene and then sufficiently purified were introduced. 80 ml of purified toluene, distilled under vacuum, were added and, after replacement of the inner atmosphere with argon, polypropylene was totally dissolved by heating at reflux, at the temperature of 110° C.

The temperature was decreased to 90° C., and a solution of n-hexane containing 0.001M sec-butyllithium was gradually added, to a total amount of 0.165 ml; then the solution suddenly turned to an orange-luminescent color, thus indicating the formation of lithium carbanion at the terminal double bond of the isotactic polypropylene.

The temperature of this carbanion was maintained at 90° C. or higher, and the mixture having cream color, prepared as reported at paragraph (3), was added and allowed to react under stirring.

The temperature of the reaction mixture, thus decolorized, was brought to room temperature and maintained under stirring overnight; then, the reaction mixture was poured into 2-L methanol, and a solid was separated by filtration and dried. The isolated block copolymer was again dissolved in hot xylene and filtered, and purified by re-precipitation from hot xylene, by decreasing the liquid temperature to room temperature.

The following hydrogenation of this block copolymer was performed as reported in the description of the catalyst preparation mentioned above.

More specifically, 0.2 g of the block copolymer were introduced into a 1-L stainless autoclave, and suspended in 100 ml of toluene. Calcium carbonate-supported black Lindlar catalyst (Pd/CaCo$_3$) was added and the reaction was carried out for 80 minutes, under a hydrogen pressure of 6.2 MPa, at a temperature of 90° C. At the end of the reaction, the pressure was reduced to the normal pressure and 100 ml of toluene were added. The obtained mixture was dried to a solid with evaporator, and a block copolymer being hydrogenated almost 100% was obtained, by re-precipitating the solid from hot xylene.

The analysis of the purified block copolymer revealed by GPC measurement that Mw was 260,000 and Mw/Mn was 2.0. The ΔH (the heat of fusion) measured by DSC of a mixture of 82 isotactic polypropylene prepared as reported in paragraph (2) and 10 cistactic-polyisoprene which ratio was equal to the weight composition in the block copolymer mentioned above was 48 J/g; this value was far below the value of the isotactic polypropylene only, and the degree of crystallization was decreased in the case of simple mixing. On the other hand, the ΔH (the heat of fusion) of the block copolymer measured by DSC was 80 J/g, which demonstrated the stabilization of the crystallizable phase.

EXAMPLE 2

Block Copolymer A-B

The operations reported in paragraphs (1) and (2) of Example 1 were repeated, while step (3) was not performed.

By modifying the operation (4) of the Example 1 as mentioned below, the amorphous elastomeric block segment was prepared using a carbanion of an isotactic polypropylene as an initiator.

(4) Preparation of Block Copolymer A-B

A three-inlet flask equipped with reflux, inlet tube and agitator, from which impurities were sufficiently purged was connected to the vacuum line; 0.3 g of the isotactic polypropylene obtained as reported in paragraph (2) of Example 1, re-precipitated from hot xylene and sufficiently purified, were introduced into said flask. 80 ml of dehydrated and purified toluene were added, after distillation under vacuum, and after replacing the inner atmosphere with argon, polypropylene was totally dissolved by heating under reflux, at the temperature of 110° C.

The temperature was lowered to 90° C., and a n-hexane solution containing 0.001M sec-butyllithium was gradually added, to reach the amount of 0.165 ml; the solution suddenly turned to an orange-luminescent color, which confirmed the formation of a lithium carbanion at the terminal double bond of the isotactic polypropylene.

The temperature of the carbanion solution was maintained at 90° C. or higher, and 10 mmol of isoprene previously introduced in the inlet tube were added and allowed to react, under stirring.

The temperature of the reaction mixture, thus decolorized, was brought to room temperature, and maintained under stirring overnight; then the reaction mixture was poured into 2-L methanol, and a solid was separated by filtration and dried. The obtained block copolymer was again dissolved in hot xylene, filtered, and purified by re-crystallization from hot xylene, by decreasing the liquid temperature to room temperature.

The analysis of the xylene-soluble portion revealed that it was cistactic-polyisoprene, having Mw of 2,300 and Mw/Mn of 1.20. Based on the living anion polymerization characteristics, it was found that these values were equal to the molecular weight and molecular weight distribution of the amorphous B segment of the block copolymer thus formed.

The $\Delta H$ (the heat of fusion) measured by DSC of a mixture of 8 weight parts of isotactic polypropylene prepared as reported in paragraph (2) of Example 1, and 1 weight part of cistactic-polyisoprene prepared as reported in paragraph (4) of Example 2, was 63.7 J/g; this value was far below the value for the isotactic polypropylene only, and the degree of crystallization was decreased in the case of simple mixing. On the other hand, the $\Delta H$ (the heat of fusion) of the block copolymer measured by DSC was 80 J/g, which clearly indicated that the stabilization of the crystallizable phase was achieved.

The $\Delta H$ (the heat of fusion) of the mixture of 9 weight parts of the block copolymer and 1 weight part of cis-polyisoprene prepared as reported in paragraph (4) of Example 2 was 80 J/g, which clearly indicated that the block copolymer contained a stable elastomer phase.

EXAMPLE 3

Block Copolymer A-B

As reported in Example 2, the operations described in paragraphs (1) and (2) of Example 1 were repeated, while (3) was modified as mentioned below. The operation reported in paragraph (4) of Example 1 was performed in the same manner, with the exception of the amorphous elastomer section, modified as reported in paragraph (3) of Example 3.

(3) Preparation of the Block B Segment

Living anion polymerization in a vacuum line:

A 300-ml flask was set to a vacuum line, in which the impurities were purged in order to carry out a living anion polymerization; then 40 mmol of isoprene, previously sufficiently purified [(1) for 1 night at reflux under agitation with $CaH_2$, (2) then, the solution was contacted with sodium pellets, at room temperature, and maintained under stirring for 24 hours or longer. A small amount of oligomers was produced at this operation. (3) The solution was contacted with n-butyllithium at room temperature, and (4) was divided into small fractions after distillation using a Schlenk tube], 40 mmol of butadiene and 20 mmol of 2-methyl-1,3-pentadiene were introduced in this flask, by means of the Schlenk tube under vacuum, after distillation, and 10 ml of sufficiently purified n-hexane was also introduced into the flask. The temperature of the solution was brought to room temperature, and under constant stirring, the solution was allowed to cool to 0° C. with an ice-water bath.

3.12 ml of a cyclohexane-n-hexane solution, containing 0.155 mmol of sec-butyllithium, were introduced by means of a previously equipped inlet tube with a breakable seal, to effect a living anion polymerization.

After a reaction time of 10 hours or longer, the reaction mixture was solidified by cooling with liquid nitrogen.

0.0025 mmol of 1,2-dibromoethane as a coupling agent, previously prepared at the inlet tube, was added all together, and the mixture was heated to −70° C. by using dry-ice methanol in order to liquefy the mixture and to allow the reaction.

A portion of this reaction mixture, having a yellowish cream color, was isolated and injected into 100 ml of methanol, and the filtered product was dried under vacuum, thus obtaining the polymer.

The analysis confirmed that the polymer was cistactic-poly(1,4-isoprene-butadiene-2-methyl-1,3-butadiene), having a molecular weight (Mn) of 2,500 g/mol and a molecular weight distribution (Mw/Mn) of 1.2.

(4) Preparation of the Block Copolymer A-B

The operation described in paragraph (4) of Example 1 was performed in the same manner, using the amorphous elastomer segment obtained in paragraph (3) of Ex. 3.

The $\Delta H$ (the heat of fusion) measured by DSC of the mixture of 8 weight parts of an isotactic polypropylene prepared in paragraph (2) of Example 1 and 1 weight part of an elastomer prepared in paragraph (3) of Example 3 was 60.7 J/g which was far below the value of the isotactic polypropylene, and the degree of crystallization was decreased in the case of the simple mixing.

However, the $\Delta H$ (the heat of fusion) measured by DSC of the block copolymer was 80 J/g, which demonstrated the stabilization of the crystallizable phase.

EXAMPLE 4

Tri-Block Copolymer A-B-A

The operations described in paragraphs (1) and (2) of Example 1 were repeated.

(3) Preparation of a Bifunctional Anion Polymerization Initiator

A 200-ml flask, equipped with side tubes and an agitator, sufficiently purged from impurities in order to operate a living anion polymerization, was connected to a vacuum line.

Sodium (1.0 g), previously charged in a side tube, was heated until it became liquid and the liquid was introduced into the flask; a sodium mirror was then prepared by heating the flask, in order to vaporize the sodium in the flask.

Then, 150 ml of a THF solution containing sufficiently purified alpha-styrene (3.4 g) were introduced from another side tube, and the mixture showed a transparent red coloration. After the coloration, the reaction was maintained for 3 hours under agitation.

The obtained product was filtered by means of a glass filter to remove the excess of sodium, thus obtaining a THF solution (0.192 mmol/L) of the disodium salt of alpha-methylstyrene oligomer (tetramer), ready to be used as bifunctional polymerization initiator.

(4) Preparation of the Block B Segment

Living anion polymerization in a vacuum line:

A 300-ml flask was set to a vacuum line in which the impurities were purged, in order to carry out a living anion polymerization; then, 3.4 g of isoprene, previously sufficiently purified, [(1) for 1 night at reflux under agitation with $CaH_2$, (2) then, the solution was contacted with sodium pellets, at room temperature, and maintained under stirring for 24 hours or longer. A small amount of oligomers was produced at this operation. (3) The solution was contacted with n-butyllithium at room temperature, and (4) was divided into small fractions after distillation using a Schlenk tube] and 4.11 g of 2-methyl-1,3-pentadiene were introduced in the flask by means of a different Schlenk tube, under vacuum after a distillation, and sufficiently purified n-hexane was also introduced into the flask after a distillation.

The temperature of this solution was raised to room temperature, and under constant stirring, the solution was allowed to cool to 0° C. with an iced-water bath.

10 ml of the THF solution containing the disodium salt of alpha-methyl styrene oligomer (tetramer), as anion polymerization initiator, were added through a previously equipped inlet tube with a breakable seal; the transparent red color of the initiator quickly disappeared and the mixture turned to a transparent yellow color. The formation of the carbanions of the introduced monomer was confirmed by this color change, and the living anion polymerization was carried out.

After a reaction time of 12 hours or longer, the reacted solution was solidified by cooling with a liquid nitrogen bath.

0.0040 mmol of 1,2-dibromoethane, previously prepared in the inlet tube, were added all together, then heated to −70° C. by using dry-iced methanol, thus allowing the mixture to liquefy and react.

A portion of this reacted mixture was isolated and injected into 100 ml of methanol, and the filtered fraction was dried under vacuum to obtain the polymer.

It was confirmed by analysis that the polymer was poly((1-methyl-1-butenylene)-CO-(1,3-dimethyl-1-butenylene)), having a molecular weight (Mn) of $2.6 \cdot 10^4$ g/mol and having a molecular weight distribution Mw/Mn of 1.32.

(5) Preparation of Tri-Block Copolymer A-B-A

A three-inlet flask equipped with reflux, inlet tube and agitator, from which impurities were sufficiently purged, was connected to the vacuum line, and 0.3 g of isotactic polypropylene obtained as reported in (2) and re-precipitated from hot xylene and then sufficiently purified were introduced. 80 ml of purified toluene, distilled under vacuum, were added and, after replacement of the inner atmosphere with argon, polypropylene was totally dissolved by heating at reflux, at the temperature of 110° C.

The temperature was decreased to 90° C., and a solution of n-hexane containing 0.001M sec-butyllithium was gradually added, to a total amount of 0.165 ml; then the solution suddenly turned to an orange-luminescent color, thus indicating the formation of lithium carbanion at the terminal double bond of the isotactic polypropylene.

The temperature of this carbanion was maintained at 90° C. or higher, and the mixture having cream color, prepared as reported at paragraph (3), was added and allowed to react under stirring.

The temperature of the reaction mixture, thus decolorized, was brought to room temperature and maintained under stirring overnight; then, the reaction mixture was poured into 2-L methanol, and a solid was separated by filtration and dried. The isolated block copolymer was again dissolved in hot xylene and filtered, and purified by re-precipitation from hot xylene, by decreasing the liquid temperature to room temperature.

The following hydrogenation of this block copolymer was performed as reported in the description of the catalyst preparation mentioned above.

More specifically, 0.2 g of the block copolymer were introduced into a 1-L stainless autoclave, and suspended in 100 ml of toluene. Calcium carbonate-supported black Lindlar catalyst ($Pd/CaCo_3$) was added and the reaction was carried out for 80 minutes, under a hydrogen pressure of 6.2 MPa, at a temperature of 90° C. At the end of the reaction, the pressure was reduced to the normal pressure and 100 ml of toluene were added. The obtained mixture was dried to a solid with evaporator, and a block copolymer being hydrogenated almost 100% was obtained, by re-precipitating the solid from hot xylene.

The analysis of the purified block copolymer revealed by GPC measurement that Mw was 2,486,000 and Mw/Mn was 2.0. The ΔH (the heat of fusion) measured by DSC of a mixture of isotactic polypropylene prepared as reported in paragraph (2) and poly((1-methyl-1-butenylene)-CO-(1,3-dimethyl-1-butenylene)), with a composition of 5.6 weight % which is equal to the weight percentage in the block copolymer mentioned above, was 38 J/g; this value was far below the value of the isotactic polypropylene only, and the degree of crystallization was decreased in the case of simple mixing. On the other hand, the ΔH (the heat of fusion) of the block copolymer measured by DSC was 78 J/g, which demonstrated the stabilization of the crystallizable phase.

EXAMPLE 5

Tri-Block Copolymer A-B-A

The operations (1) and (2) were repeated as reported in Example 4, while steps (3) and (4) were not performed.

By modifying the operation (5) of Example 4 as mentioned below, after the preparation of an amorphous elastomer segment, by using a carbanion of an isotactic polypropylene as an initiator, the coupling reaction for dimerization was carried out.

(5) Preparation of Tri-Block Copolymer A-B-A

A three-inlet flask equipped with reflux, inlet tube and agitator, from which impurities were sufficiently purged, was connected to the vacuum line; 0.3 g of the isotactic polypropylene obtained as reported in paragraph (2) of Example 1, re-precipitated from hot xylene and sufficiently purified, were introduced into said flask. 80 ml of dehydrated and purified toluene were added, after distillation under vacuum, and after replacing the inner atmosphere with argon, polypropylene was totally dissolved by heating under reflux, at the temperature of 110° C.

The temperature was lowered to 90° C., and a n-hexane solution containing 0.001M sec-butyllithium was gradually added, to reach the amount of 0.165 ml; the solution suddenly turned to an orange-luminescent color, which confirmed the formation of a lithium carbanion at the terminal double bond of the isotactic polypropylene.

The temperature of the carbanion solution was maintained at 90° C. or higher, and 10 mmol of isoprene previously introduced in the inlet tube were added and allowed to react, under stirring.

The reacted mixture of isoprene, showing the carbanion color (transparent yellow), was agitated for 6 hours and the temperature was gradually brought to the room temperature. The obtained mixture was solidified using a liquid nitrogen bath; after adding all together 10 ml of a toluene solution containing 0.0040 mmol of 1,2-dibromoethane, the mixture was heated to −70° C. using dry-iced methanol, in allow the mixture to liquefy and undergo the coupling reaction.

The temperature of the mixture was brought again to room temperature, and the mixture was filtered. The filtrate was poured into 2-L methanol, and a solid was separated by filtration and dried. The obtained block copolymer was again dissolved in hot xylene, filtered, and purified by re-precipitation from hot xylene, by decreasing the liquid temperature to room temperature. The poly(isoprene) polymerized using an excess of s-butyllithium was soluble in xylene, and the analysis revealed that it was poly(isoprene) having Mw of 2,200 and Mw/Mn of 1.20; Based on the living anion polymerization characteristics, it was found that these values were equivalent to the molecular weight and molecular weight distribution of the amorphous B segment of the block copolymer thus formed.

The ΔH (heat of fusion) measured by DSC of a mixture of 8 weight parts of isotactic polypropylene prepared as reported in paragraph (2) of Example 1, and 1 weight part of poly(isoprene) isolated from xylene as reported in paragraph (5) of Example 5, was 53.7 J/g; this value was far below the value for the isotactic polypropylene only, and the degree of crystallization was decreased in the case of simple mixing. On the other hand, the ΔH (heat of fusion) of the mixture of the block copolymer and the poly(isoprene) prepared as reported in paragraph (5) of Example 5, at a ratio of 9 to 1 measured by DSC, was 80 J/g, which meant that the mixture contained an elastomer phase in a stable condition.

EXAMPLE 6

Tri-Block Copolymer A-B-A

The operations (1), (2) and (3) of Example 4 were repeated, while step (4) of Example 4 was modified as mentioned below. The operation reported in paragraph (5) of Example 4 was performed in the same manner, with the exception of the use of the amorphous elastomer segment modified as reported in paragraph (4) of Example 6.

(4) Preparation of the Block B Segment

Living anion polymerization in a vacuum line:

A 300-ml flask was set to a vacuum line, in which the impurities were purged in order to carry out a living anion polymerization; then 40 mmol of isoprene previously purified, 40 mmol of butadiene, and 20 mmol of 2-methyl-1,3-pentadiene [the purification of the diene monomer was carried out as follows: (1) for 1 night at reflux under agitation with $CaH_2$, (2) then, the solution was contacted with sodium pellets, at room temperature, and maintained under stirring for 24 hours or longer. A small amount of oligomers was produced at this operation. (3) The solution was contacted with n-butyllithium at room temperature, and (4) was distilled using a Schlenk tube] were introduced in this flask, by means of the Schlenk tube under vacuum, after distillation, and 30 ml of sufficiently purified toluene was also introduced into the flask, after distillation under vacuum.

The temperature of the solution was brought to room temperature, and under constant stirring, the solution was allowed to cool to 0° C. with an ice-water bath.

When 10 ml of a THF solution of the bifunctional anion polymerization initiator, i.e. the sodium salt of alpha-methylstyrene oligomer (tetramer) obtained as mentioned above, were introduced from a previously-equipped inlet tube with a breaker seal, the transparent red color of the initiator was quickly decolorized and the mixture turned to transparent yellow.

The formation of carbanions was confirmed by these phenomena, and the living anion polymerization took place.

After a reaction time of 10 hours or longer, the liquid was cooled and solidified by means of a liquid nitrogen bath. 10 ml of a toluene solution containing 0.0040 mmol of 1,2-dibromoethane, previously prepared in the inlet tube, were added all together, and the mixture was then liquefied by heating to −70° C., using dry-iced methanol, thus allowing the reaction to take place.

The thus obtained yellowish cream colored reaction mixture was partially sampled and injected into 100 ml of methanol. The residue of the filtration was sufficiently rinsed and vacuum-dried to isolate the polymer.

The analysis confirmed that the obtained polymer was poly((1-methyl-1-butenylene)-CO-(1,3-dimethyl-1-butenylene)), having a molecular weight (Mn) of 2,600 g/mol and a molecular weight distribution (Mw/Mn) of 1.2.

(5) Preparation of the Tri-Block Copolymer A-B-A

The operation described in paragraph (5) of Example 4 was performed in the same manner, with the exception that the amorphous elastomer segment obtained in paragraph (4) of Example 6 was used.

The ΔH (heat of fusion) measured by DSC of the mixture of 8 weight parts of an isotactic polypropylene prepared in paragraph (2) of Example 1 and 1 weight part of an elastomer prepared in paragraph (4) of Example 6 was 62.4 J/g which was far below the value of the isotactic polypropylene, and the degree of crystallization was decreased in the case of the simple mixing.

However, the ΔH (heat of fusion) measured by DSC of the block copolymer was 80 J/g, which demonstrated that the stabilization of the crystallizable phase was achieved.

Since the crystallizable block copolymer of the present invention is has a controlled structure, besides being useful as it is for the molding material, it can be advantageously used as a compatibilizer, a surfactant, a modifier, a mechanical property improvement agent and the like, in products obtained by injection molding of polymers and polymer blends, or in products obtained by blow or extrusion molding, such as fibers, films, sheets, foamed articles and the like, in order to obtain homogeneous structure, good moldability, good balance of mechanical properties, stabilization of the phase structure and modification of resins.

The invention claimed is:

1. A block copolymer having formula A-B (I) or A-B-A (II), wherein A is a crystallizable isotactic polypropylene block segment (Block A segment) having a degree of polymerization ranging from 5 to 200,000 and a molecular weight distribution Mw/Mn<2.5, and B is an amorphous olefinic elastomeric block segment (Block B segment) having a molecular weight ranging from 100 to 500,000 g/mol, and a molecular weight distribution (Mw/Mn)≦2.0.

2. The block copolymer as claimed in claim 1, wherein the Block A segment has an isotactic pentad ratio (IP), measured by $^{13}C$-NMR, ≧85.0%, and a degree of polymerization ranging from 10 to 100,000.

3. The block copolymer as claimed in claim 1, wherein the Block B segment is obtained by the polymerization of an olefinic unsaturated monomer, the block copolymer corresponding to formula (I)':

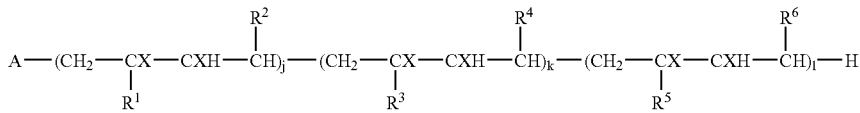

or to formula (II)':

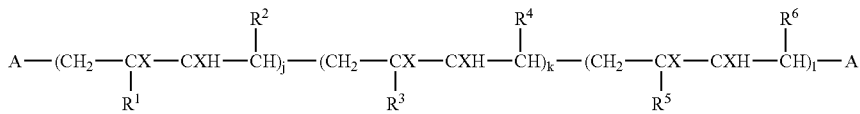

wherein A is the Block A segment; X is hydrogen, or two X groups linked to two adjacent carbon atoms form a carbon-carbon double bond; the groups $R^1$ to $R^6$ are independently hydrogen or an unsaturated or saturated alkyl group, having 1 to 8 carbon atoms; j, k and l are independently 0 or an integer >0, and at least one of j, k and l is an integer >0.

4. A process for producing a block copolymer having formula A-B (I) or A-B-A (II), wherein A is a crystallizable isotactic polypropylene block segment (Block A segment) having a degree of polymerization ranging from 5 to 200,000 and a molecular weight distribution Mw/Mn<2.5, and B is an amorphous olefinic elastomeric block segment (Block B segment), which comprises the cross-coupling of carbanions using a coupling agent, wherein a first carbanion is obtained by a reaction between a terminal unsaturated bond of an isotactic polypropylene and an organic metal compound, and a second carbanion is obtained by living anion polymerization of an olefinic unsaturated monomer, using an initiator, or by polymerizing an olefinic unsaturated monomer by a sequential living anion polymerization using a carbanion obtained by a reaction between a terminal unsaturated bond of an isotactic polypropylene and an organic metal compound as the initiation point of the polymerization.

5. The process as claimed in claim 4, wherein the Block A segment is an isotactic polypropylene block having a terminal unsaturated bond polymerized by using a metallocene catalyst.

6. A process comprising forming an article comprising a block copolymer having formula A-B (I) or A-B-A (II), wherein A is a crystallizable isotactic polypropylene block segment (Block A segment) having a degree of polymerization ranging from 5 to 200,000 and a molecular weight distribution Mw/Mn<2.5, and B is an amorphous olefinic elastomeric block segment (Block B segment) having a molecular weight ranging from 100 to 500,000 g/mol, and a molecular weight distribution (Mw/Mn)≦2.0.

7. The process of claim 6 wherein the article is selected from a molded article or packaging material.

8. The process of claim 7 wherein the packaging material is food packaging material.

9. The process of claim 7 wherein the molded article is selected from automotive or appliance products.

10. A process comprising preparing a polymer composition comprising a block copolymer having formula A-B (I) or A-B-A (II), wherein A is a crystallizable isotactic polypropylene block segment (Block A segment) having a degree of polymerization ranging from 5 to 200,000 and a molecular weight distribution Mw/Mn<2.5, and B is an amorphous olefinic elastomeric block segment (Block B segment) having a molecular weight ranging from 100 to 500,000 g/mol, and a molecular weight distribution (Mw/Mn)≦2.0.

11. The process of claim 10 where the polymer composition is selected from a cosmetic formulation or a medical formulation.

12. A molded article comprising a block copolymer having formula A-B (I) or A-B-A (II), wherein A is a crystallizable isotactic polypropylene block segment (Block A segment) having a degree of polymerization ranging from 5 to 200,000 and a molecular weight distribution Mw/Mn<2.5, and B is an amorphous olefinic elastomeric block segment (Block B segment) having a molecular weight ranging from 100 to 500,000 g/mol, and a molecular weight distribution (Mw/Mn)≦2.0.

13. Films, fibers, sheets or foamed articles comprising a block copolymer having formula A-B (I) or A-B-A (II), wherein A is a crystallizable isotactic polypropylene block segment (Block A segment) having a degree of polymerization ranging from 5 to 200,000 and a molecular weight distribution Mw/Mn<2.5, and B is an amorphous olefinic elastomeric block segment (Block B segment) having a molecular weight ranging from 100 to 500,000 g/mol, and a molecular weight distribution (Mw/Mn)≦2.0.

* * * * *